Jan. 2, 1968

A. F. WISHMAN ETAL 3,362,001

CORELESS IRON SHUNT REACTOR HAVING HIGH
DIELECTRIC STRENGTH INSULATION

Filed July 28, 1966

Inventors
August F. Wishman
Harding B. Hansen
By Lee H. Kaiser
Attorneys

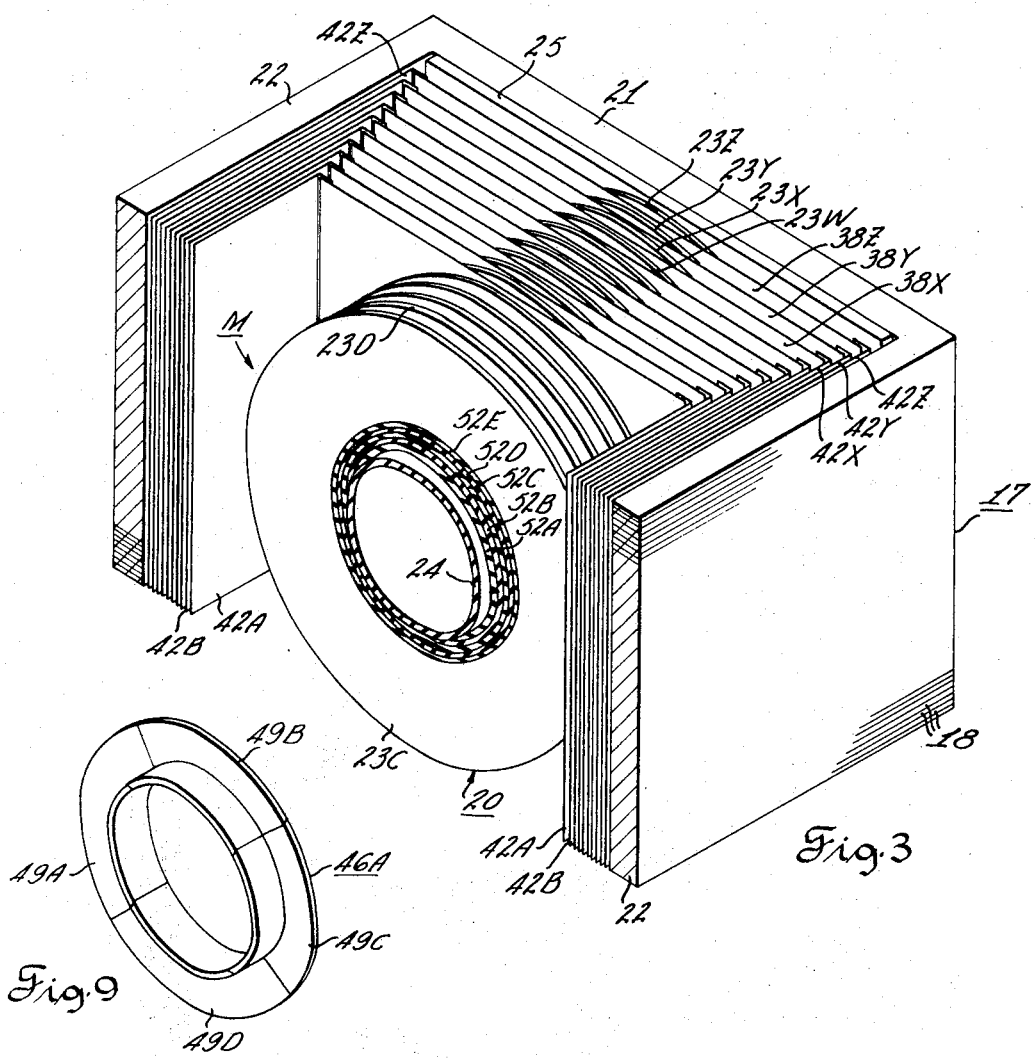
Fig. 3
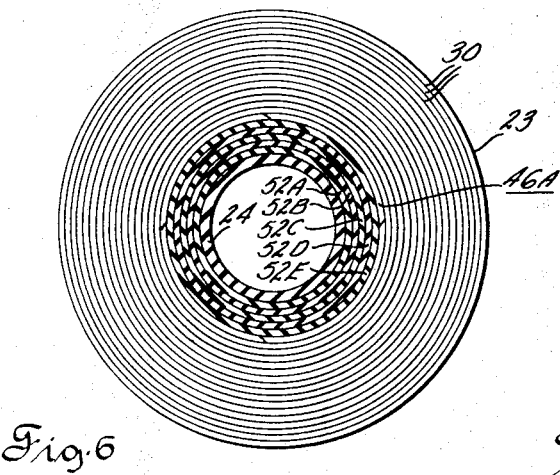
Fig. 9
Fig. 6
Inventors
August F. Wishman
Harding B. Hansen
By Lee H. Kaiser
Attorney

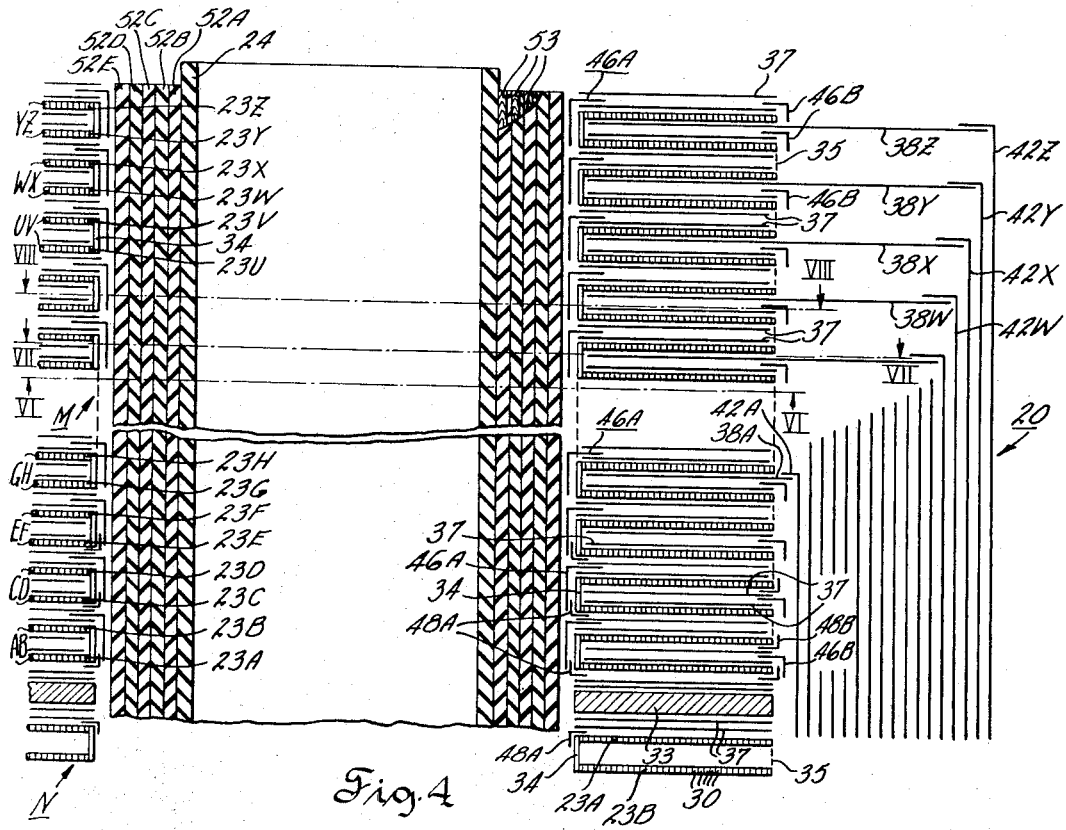
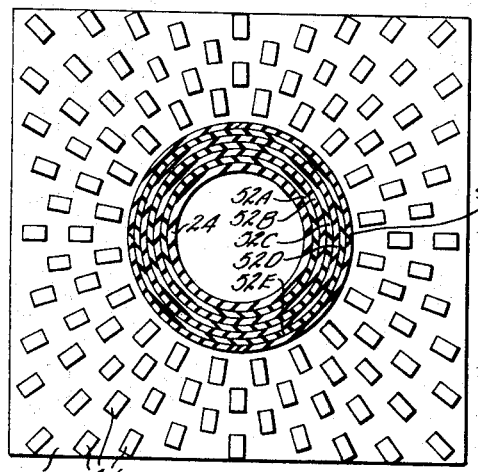
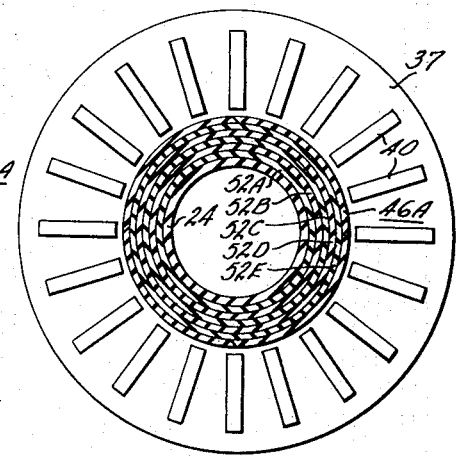
Fig. 4
Fig. 7
Fig. 8
Inventors
August F. Wishman
Harding B. Hansen
By Lee H. Kaiser
Attorney

United States Patent Office 3,362,001
Patented Jan. 2, 1968

3,362,001
CORELESS IRON SHUNT REACTOR HAVING HIGH DIELECTRIC STRENGTH INSULATION
August F. Wishman, Hales Corners, and Harding B. Hansen, Waukesha, Wis., assignors to Allis-Chalmers Manufacturing Company, Milwaukee, Wis.
Filed July 28, 1966, Ser. No. 568,586
21 Claims. (Cl. 336—60)

This invention relates to shunt reactors for electrical power distribution and transmission systems and in particular to shunt reactors for extra high voltage (EHV) systems rated at 345 kilovolts and above.

Shunt reactors are used in high voltage, alternating current power transmission and distribution lines to compensate for line charging current and to allow the charge remaining on the line to bleed to ground when the line is opened. The magnetic flux near the axial ends of the coil of shunt reactors of large physical size deviates from an axial direction, and the radial component of the flux results in high eddy current losses and reacts with the current in the adjacent conductor turns of the coil to produce high compressive forces. The conductor of a shunt reactor coil is usually subdivided and transposed in the radial direction to minimize eddy current losses, and the coil conductor of large EHV shunt reactors must also be subdivided and transposed in an axial direction to prevent excessive eddy currents at the coil ends due to the radial component of the magnetic flux.

A shunt reactor is usually immersed in oil within a tank and has a nonmagnetic core, or a laminated steel core provided with gaps, to provide high magnetizing current. The reactor coil is either disposed in a nonmagnetic tank or provided with magnetic end shielding to limit the stray flux and prevent excessive eddy current heating of the casing walls which may damage the casing.

An air core coil for a conventional shunt reactor has a considerable component of magnetic flux in a radial direction at both coil ends regardless of whether the coil is in free space or has magnetic shield material disposed a considerable distance from the coil, and such air core coils are conventionally wound with individually insulated strands of round conductor to reduce the eddy current loss and prevent excessive heating, and the conductor dimensions must be small in all directions because both the axial and radial components of the flux are large in some locations within the coil. The space factor of round conductors wound with round cables in known air core reactors is very poor and is generally less than 75 percent, and when wound in layers spaced by ducts this value is multiplied by the factor 0.7854, resulting in a shaped space factor of only 0.75 times 0.7854 or approximately 0.59. Magnetic end shields used to prevent excessive eddy current heating in the metallic tank of prior art reactors have been placed at a considerable distance from the coil to provide sufficient insulation distance to prevent electrical breakdown and heretofore have increased the inductance of the coil less than ten percent.

The coil of known shunt reactors usually comprises a plurality of coaxial pancake coils arranged in a stack with sufficient spacing between adjacent pancake windings to prevent the voltage gradient from exceeding the breakdown voltage of the insulation, and the relatively large spacing required between adjacent pancake coils resulted in large physical size of the reactor for a given kva rating. Further, the pancake windings are often supported on insulating means extending axially of the coil including a plurality of telescoped inside insulating cylinders of suitable insulation such as paper, and the radial thickness of the large number of such oil impregnated inside insulating cylinders required to provide the necessary insulation breakdown strength resulted in an undesired "sponginess" and a mechanically weak coil structure.

The inductance of a reactor coil can be increased by using an iron core with spaced gaps inside the coil, but the clearance required between the coil and its interior iron is so large in high voltage reactors that only a small space is available for the iron core, and consequently the increase in reactance is not sufficient to justify the additional expense of the iron core. The iron core must be constructed with gaps to provide linear characteristics for the reactor and prevent saturation of the iron, thereby requiring the use of a large number of small laminations which complicate the construction. The relatively small laminations are difficult to hold in place mechanically, and it is difficult to cool the iron core disposed within the axial opening in the coil. Vibration and noise at the gaps of the iron core must be reduced to acceptable values, and further the gaps must be kept small to reduce the amount of fringing flux cutting the coil. Still further, the coil conductor of an iron core reactor must be subdivided in the axial direction to reduce the eddy current loss resulting from the radial component of the magnetic flux caused by the air gaps in the core. Also an iron core reactor must be larger than desirable in the coil axial direction to provide sufficient iron for mechanical support of the lamination packets on each side of the air gaps in the core.

A shunt reactor construction is disclosed in the copending application of William C. Sealey and Michael W. Waterman, Ser. No. 553,844, filed May 31, 1966, and having the same assignee as the subject application, which is lighter, more compact, and less costly than shunt reactors heretofore known and has an inductance several times that of an equivalent air core reactor of the same physical size. The reactor disclosed in said application has an axially short coil and magnetically permeable yoke means adjacent the ends of the coil which straighten the magnetic flux lines within the coil and decrease the length of the average flux path so that substantially all of the reluctance of the magnetic flux path is internal of the coil.

It is an object of the invention to provide an improved shunt reactor wherein the ratio of coil radius to coil axial length is substantially increased in comparison to known reactors of the same voltage rating, thus resulting in an increase in magnetic flux density and a corresponding increase in inductance for a given physical size of reactor.

It is a further object of the invention to provide an improved shunt reactor wherein the axial spacing between adjacent pancake windings of the reactor coil is substantially reduced in comparison to known reactor coils of the same voltage rating, thus permitting reduction in the axial length of the reactor coil and resulting in substantial reduction in size and weight for a given kva rating in comparison to known reactors.

Another object of the invention is to provide an improved shunt reactor coil construction which results in substantially greater inductance per unit volume than known reactor coils of the same voltage rating. A further object of the invention is to provide an improved shunt reactor construction which has a reduced length of magnetic flux path in air in comparison to known reactors of the same voltage rating, thus resulting in an increase in magnetic flux density and a corresponding increase in inductance for a given physical size of reactor.

Another object is to provide such an improved shunt reactor construction wherein the coil is mechanically strong and does not have the "sponginess" which is characteristic of known reactors.

These and other objects and advantages of the invention will be more readily apparent from the following detailed description when considered in conjunction with the accompanying drawing wherein:

FIG. 3 is a perspective view of the coil and the magnetic core of FIG. 2, only a portion of the pancake windings being shown and the pairs of pancake windings not being shown;

FIG. 4 is a cross sectional view through the reactor coil of FIGS. 2 and 3;

FIGS. 6, 7 and 8 are views taken on lines VI—VI, VII—VII and VIII—VIII respectively of FIG. 4;

FIG. 9 is a perspective view of one of the insulating collars of the coil of FIG. 4;

Figure 1:
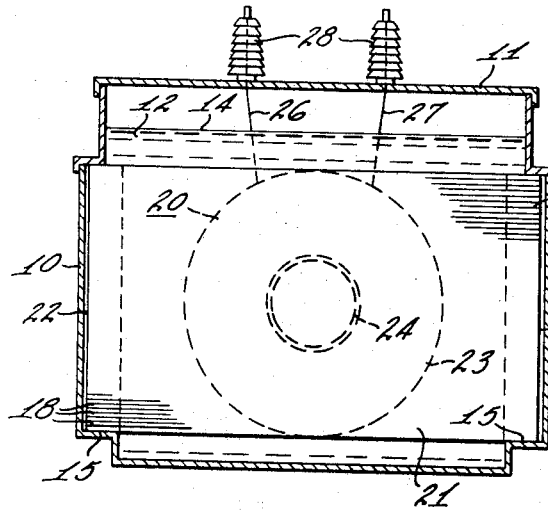
FIG. 1 is an end view of a shunt reactor embodying the invention with the tank end wall broken away.

Referring to the drawing, a shunt reactor embodying the invention may be used in each phase of a multiphase extra high voltage (EHV) electrical power transmission system rated at 345 kilovolts or above and comprises a tank 10 having a cover 11 and filled with a dielectric cooling and insulating fluid 12 such as oil to a level 14. Tank 10 may have a horizontal shelf 15 extending around its entire periphery adjacent the lower end of the tank side walls which supports a rectangular magnetic yoke or core 17 having magnetic steel laminations 18 disposed in horizontal planes and parallel to the axis of a reactor coil 20 positioned within the window of the rectangular core 17 so that the axial ends of the coil 20 are closely adjacent the end magnetic portions 21 of magnetic yoke 17 and both magnetic yoke 17 and coil 20 are immersed in the dielectric fluid 12.

Figure 2:
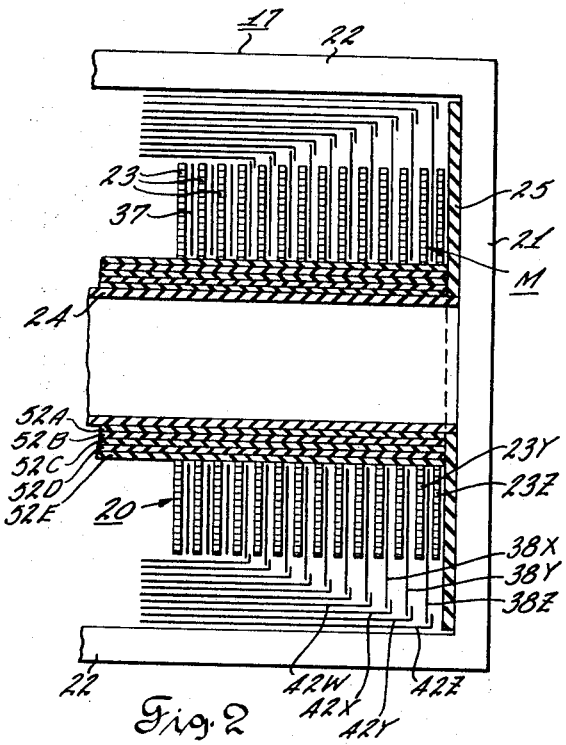
FIG. 2 is a partial schematic plan view, partly in section, of the coil and magnetic yoke of the reactor of FIG. 1, only a portion of the pancake windings being shown and the pairs of pancake windings not being shown.

Coil 20 has a nonmagnetic core and comprises a plurality of electrically connected but axially spaced coaxial pancake windings 23. In a typical shunt reactor coil 20 may have approximately 80 pancake windings 23. Pancake windings 23 surround and are preferably supported on a tube 24 of an insulating material having high dielectric strength to be described hereinafter, and support tube 24 extends beyond the end pancake windings 23 and into circular openings in insulating headboards 25 (see FIG. 2) disposed adjacent the magnetic core end portions 21.

As disclosed in the aforementioned Sealey et al. application, the magnetic core end portions 21 closely adjacent the axial ends of coil 20 straighten the magnetic flux lines within the coil 20 and decrease the length of the average flux path, in comparison to prior art shunt reactors, so that substantially all of the reluctance of the magnetic flux path is internal of the coil. Further, coil 20 has improved insulation which permits reduction in the axial spacing between adjacent pancake windings 23 for a given voltage rating and thus permits construction of a coil having a greater ratio of coil radius R to coil axial length $b$ than known structures, thereby substantially increasing the inductance for a given size of reactor.

Figure 5:
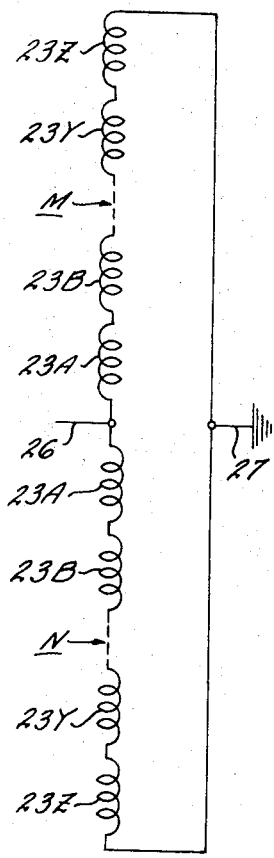
FIG. 5 is a schematic circuit diagram of the coil of FIG. 4.

Coil 20 terminates in two conductor leads 26 and 27 which are connected to conductor studs on insulating bushings 28 mounted on cover 11. As schematically illustrated in FIG. 5, the pancake windings 23 are preferably arranged in two parallel connected groups M and N having the pancake windings 23 in each group connected in series with each other. Preferably lead 26 from the high voltage line is connected to a pair of pancake windings 23A at the center of the stack of pancake windings, one being in each group M and N, and lead 27 is connected to the pancake windings 23Z at the axial ends of coil 20 adjacent core end portions 21 and to ground. This arrangement minimizes the potential difference between the pancake windings 23Z at the axial ends of coil 20 and the magnetic core 17 and permits the magnetic core 17 to be closely adjacent the axial ends of the coil 20 and to be most effective in straightening the lines of magnetic flux within coil 20. The pancake windings 23 in the two groups are wound in opposite directions so that the magnetic flux in all portions of coil 20 is the same.

Each pancake winding 23 is preferably wound from a continuous strip 30 of rectangular cross section (see FIGS. 4 and 6) having a width in the axial direction substantially greater than its thickness in the radial direction. Copper strip .05 inch thick and 0.25 inch wide may be employed for conductor 30, and each turn of strip 30 is suitably insulated from the next. Known air core reactors are wound with individually insulated strands of round conductor to reduce eddy current loss and prevent excessive heating, and the conductor dimensions must be small in all directions because both the axial and the radial components of the flux are large in some locations within the coil. The space factor of round conductors wound into round cables of prior art reactors is very poor and is generally less than 75 percent, and when wound in layers spaced by ducts this value is multiplied by 0.7854 and results in the poor space factor of 0.75 times 0.7854 or approximately 0.59. Inasmuch as the axial length of the coil of the invention is substantially reduced in comparison to known shunt reactor coils and the flux lines are parallel to the coil axis, subdivision of the conductor in the axial direction is not required, and each pancake winding 23 is preferably wound of conductor 30 of rectangular cross section having a width several times its thickness, thereby materially improving the space factor.

The two groups M and N of pancake windings are similar, and only group M will be described. A static plate 33 (see FIG. 4) may be provided at the center of the stack of pancake windings 23. The pancake windings 23 of group M are preferably arranged in pairs of adjacent pancake windings electrically connected together at their radially inner end. For example, the pancake windings 23A and 23B constitute a winding pair AB and are electrically connected together at their inner end by a conductor shown as 34; the windings 23C and 23D similarly constitute a winding pair CD and are electrically connected at their inner end by a conductor 34; and the windings 23Y and 23Z constitute a winding pair YZ and are electrically connected at their inner end by a conductor 34. Adjacent winding pairs are electrically connected at their radially outer end, for example, winding pairs AB and CD are connected at their outer end by a conductor 35 shown on dotted lines in FIG. 4 and similarly winding pairs YZ and WX are electrically connected at their radially outer end by a conductor 35 shown in dotted lines.

A pair of insulating washers are disposed between the pancake windings 23 of each pair. One insulating washer 37 (see FIGS. 4 and 8) is annular and of approximately the same diameter as the pancake windings 23, and spaced apart, radially extending, insulating spacer sticks 40 (see FIG. 8) are affixed to washers 37 to provide cooling ducts between the pancake windings 23 of each pair. A second annular insulating washer is disposed between the pancake windings 23 of certain winding pairs adjacent the center of coil 20, for example washer 37 between windings 23C and 23D of pair CD and between windings 23E and 23F of winding pair EF, but the second insulating washer 38 between the windings of the remaining pairs are rectangular and of greater radial dimension than the pancake windings 23 and progressively increase in the radial dimension. The rectangular washer 38A disposed between the pancake windings 23G and 23H is of the smallest width, and rectangular washer 38Z between pancake windings 23Y and 23Z is of the greatest width and its width approximates the spacing between the magnetic core side portions 22. Insulating washers 38 have kraftboard spacer blocks 41 (see FIG. 7) attached thereto and spaced apart in both axial and arcuate directions to provide ducts for the circulation of the cooling medium 12 between adjacent pancake windings of each winding pair. The rectangular insulating washers 38 extending radially of coil 20 overlap the bent over ends of vertical insulating wrapper sheets 42 disposed betwen the coil 20 and the core side portions to provide high dielectric strength therebetween. The outermost vertical insulating sheet wrapper 42Z extends along the entire height of the opening between end portions 21 of magnetic core 17, and the wrapper 42Y, 42X, 42W, etc., progressively decrease in length in a radially inward direction, thereby grading the insulation to provide maximum insulation thickness between the magnetic core 17 and the pancake windings 23 at the point of highest potential relative to ground and progressively decreasing the insulation thickness as the potential of the pancake windings relative to ground decreases and at the same time minimizing the length of the wrappers 42.

A pair of annular insulating washers 37 having spacer sticks 40 affixed thereto are also disposed between adjacent winding pairs, for example, between winding pairs UV and WX.

Figure 10:
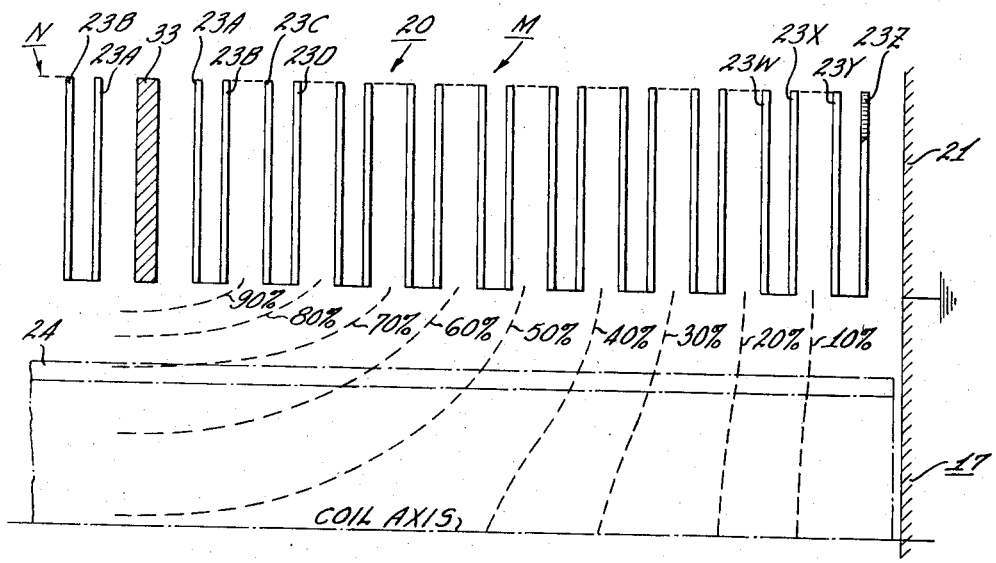
FIG. 10 is a schematic representation of the electrostatic field plot of the coil of FIG. 4.

FIG. 10 schematically illustrates a typical electrostatic field plot of equipotential lines when coil 20 is energized. This view represents a radial cross section through one coil group M. It will be noted that the diameter of support tube 24 is selected so that it is intersected by the approximately 72 percent equipotential line but not by the 80 percent voltage line and that consequently tube 24 is subjected to only approximately 72 percent of maximum voltage during impulse and operation. The field plot illustrates that the voltage gradient is high at the sharp corners of rectangular conductor strip 30 adjacent the radially inner turn of pancake windings 23 and that solid insulation should be positioned adjacent this point of high voltage gradient. Annular insulating collars 46A and 46B of L-shape cross section conform respectively to the radially inner periphery of each winding pair and to the radially outer periphery of one winding of each winding pair. For example, insulating collars 46A conform to the radially inner periphery of winding pairs AB, CD and EF, and insulating collars 46B conform to the radially outer periphery of pancake winding 23W of winding pair WX and to the radially outer periphery of pancake winding 23C of winding pair CD. The annular insulating collars 46A and 46B overlap and are interleaved with the insulating washer 37 and 38 and provide high puncture strength insulation at the points of highest potential gradient within coil 20, thereby permitting closer spacing of the pancake coils 23 for a given voltage rating than coils of known reactors. The insulating collars 46A and 46B are impregnated with oil 12 and provide "solid" insulation between adjoining winding pairs, and the word "solid" is used in the description and appended claims to connote that a continuous barrier of high puncture strength material exists in a circumferential direction between the winding pairs but not to mean that a continual bridge of insulation exists in the axial direction between the adjoining coils 23. In other words, it will be appreciated that radial cooling ducts are present between adjoining winding pairs at the point opposite the insulating collars 46 even though the insulation is described as "solid." Each insulating collar 46 is of L-shaped radial cross section and may be constructed of a single piece or a plurality of insulating angle segments, for example, insulating collar 46A may be constructed of four insulating angle segments 49A, 49B, 49C and 49D having scarfed ends as shown in FIG. 9. Each insulating angle segment 49 may extend approximately 90 degrees of arc and be of approximately 1/8 inch thick insulating material of high dielectric strength which forms easily to desired shape such as high rag content fullerboard. The scarfed ends of angle sections 49A–49D may be overlapped a distance approximately twenty times their thickness to provide high breakdown strength.

Additional L-shaped cross section insulating collars 48A of approximately 1/16-inch thick insulating board facing the opposite direction from collars 46A may be provided at the radially inner end of winding pairs adjacent the center of the stack, for example, on winding pairs AB, CD and EF, and similar additional insulating collars 48B of 1/16-inch thick insulating board may be provided at the radially outer end of certain pancake windings adjacent the center of the stack, for example, on windings 23A, 23B and 23D.

The annular pancake coils 23 are preferably supported from an insulating tube 24 of a suitable material such as phenolic material having a dielectric constant of approximately 4 which is comparable to that of oil impregnated cellulosic insulation and thus does not distort the electrostatic field and also having sufficiently high dielectric strength to withstand the stress due to the potential gradient in both axial and radial directions during the initial overvoltage test and in service. For example, the insulating means disposed within the axial opening in coil 20 for supporting pancake coils 23 should be capable of withstanding, without failure, a potential gradient greater than approximately 10 kilovolts per inch at 90° C., when coil 20 is energized at rated 60 cycle operating voltage and preferably can withstand a potential gradient of greater than approximately 15 kilovolts per inch at rated 60 cycle operating voltage for coil 20. During low frequency overvoltage tests this insulating material should be capable of withstanding a potential gradient greater than approximately 50 kilovolts per inch at 90° C. and preferably can withstand a potential gradient of approximately 110 kilovolts per inch during impulse testing. A thin wall section insulating member having small radial thickness such as support tube 24 can withstand a much higher voltage gradient in the radial direction than coil support means having a thick wall section which have been utilized heretofore. Inasmuch as dielectric heating is a function of the thickness of the material, it will be appreciated that less heat will be generated in the relatively thin wall section support tube 24 than in known coil support means having thick wall sections. Support tube 24 has less heat to dissipate while retaining approximately the same cooling surface area as the relatively thick wall section coil support means utilized heretofore, and consequently support tube 24 operates at a lower temperature than known coil support means having thick wall sections.

A plurality of telescoped inside insulation cylinders 52A, 52B, 52C, 52D and 52E may surround support tube 24 and be disposed between tube 24 and the pancake windings 23. Each inside insulation cylinder 52 may be of 1/8-inch Kraft paper wound into a tube and have 3/8-inch thick spacer sticks 53 secured thereto extending parallel to the axis of coil 20 and spaced apart circumferentially to provide cooling ducts extending axially of coil 20 for the oil 12. Fiber wedges (not shown) may be positioned between the radially outer insulation cylinder 52E and the pancake windings 23 as each pancake winding pair is assembled to prevent movement of the pancake windings 23. The insulating tube 24 having high dielectric strength permits working the material at higher voltages and prevents failure of the support means due to dielectric heating and permits reduction of the radial thickness of the telescoped inside insulation cylinders by more than 50 percent in comparison to prior art structures.

The disclosed construction of reactor coil 20 also permits the spacing between the end pancake winding 23Z and the magnetic yoke end portions 21 to be of the same order of magnitude as the spacing between adjacent pancake windings 23, thereby minimizing fringing flux at the axial ends of the coil 20 and minimizing the radial component of the magnetic flux and reducing the eddy current losses.

Figure 11:
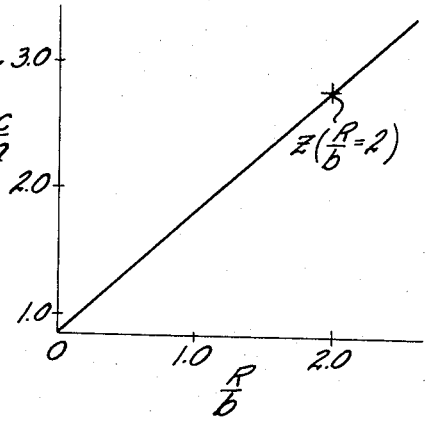
FIG. 11 is a graph plotting the ratio of the inductance of a reactor embodying the invention $L_c$ to that of a similar air core reactor $L_a$, i.e., $L_c/L_a$, against the ratio of coil radius R to coil axial length $b$, i.e., against $R/b$.

FIG. 11 is a graph plotting the ratio of the inductance of a shunt reactor embodying the invention $L_c$ to the inductance $L_a$ of an air core coil of similar size, i.e., the ratio $L_c/L_a$ against the ratio of coil outside radius R to coil axial height $b$, i.e., against the ratio $R/b$. FIG. 11 shows that the ratio of the inductance of a shunt reactor embodying the invention to that of a similar reactor having an air core increases directly with coil radius R and inversely with coil height $b$ and further shows that a reactor embodying the invention having a coil whose axial length equals its diameter ($R_b$ equals 2 at point Z on the curve) will result in an increase in inductance of approximately 290 percent in comparison to a similar prior art reactor having an air core.

The disclosed reactor coil construction permits substantial reduction in spacing between pancake windings 23 and in the radial thickness of the Kraft paper inside cylinders 52 between the support tube 24 and the pancake windings 23 and also permits the spacing between the end pancake windings 23Z and magnetic core 17 to be of the same order of magnitude as the winding-to-winding spacing. These factors contribute to decrease in coil height and increase in the ratio of coil radius R to coil height $b$ and permit the inductance of a shunt reactor embodying the invention to be theoretically increased by a factor of approximately 2.5 as a result of the increase of the magnetic flux density linking the turns of the coil. Further, as a result of improvement of space factor contributed by the use of rectangular cross section rather than round conductor in the pancake windings 23, the reactor embodying the invention has an inductance of approximately $$\left(\frac{1}{.59}\right)^2$$

or approximately 287 greater than that of an air core reactor of the same coil dimensions and the same conductor cross section but with the number of turns varied. Consequently a shunt reactor embodying the invention could theoretically have an inductance of approximately 2.5 times 2.87 equals 7.2 turns greater than that of a known air core reactor having the same coil dimensions.

While only a single embodiment of the invention has been illustrated and described, many modifications and variations thereof will be readily apparent to those skilled in the art, and consequently it is intended to cover in the appended claims all such modifications and variations which are within the true spirit and scope of the invention.

The embodiments of the invention in which an exclusive property or privilege is claimed are defined as follows:

1. A shunt reactor having high inductance per unit volume comprising, in combination, a casing, a cooling and insulating dielectric liquid within said casing, a cylindrical coil having a horizontal axis and an axial opening therein and including a plurality of coaxial, axially spaced pancake windings disposed in a stack and being constructed of strip conductor having a width in the axial direction considerably greater than the thickness in the radial direction and also including radially extending insulating washers disposed between adjacent pancake windings, said coil being immersed in said liquid dielectric and permitting circulation of said dielectric liquid verticaly between said axially spaced pancake windings and adapted to be energized at a predetermined low frequency voltage during operation, a closed magnetic core comprising laminations in planes parallel to the axis of said coil immersed in said dielectric liquid within said casing and having core end portions disposed adjacent the axial ends of said coil and core side portions parallel to the coil axis connecting said core end portions, the axial spacing between adjacent pancake windings being approximately uniform and of the same order of magnitude as the spacing between said core end portions and the pancake windings at the axial ends of said coil, said pancake windings of said coil being arranged in two similar coil halves each of which comprises the pancake windings between the center and one end of said stack, the pancake windings in each coil half being connected in series and the windings in said two coil halves being wound in opposite directions, the pancake windings at the axial ends of said coil being adjacent said core end portions and adapted to be connected to ground, a pair of adjacent pancake windings at the center of the coil stack, one of which is in each of said coil halves, being adapted to be connected to a high voltage conductor, and means including a horizontal member supported adjacent its ends disposed within said axial opening for supporting said coil with its axis horizontal and being of a high dielectric strength nonmagnetic material capable of withstanding without failure a potential gradient greater than 10 kilovolts per inch when said coil is energized at said predetermined operating voltage and also capable of withstanding, without failure, the tensile forces resulting from the weight of said coil.

2. A shunt reactor in accordance with claim 1 wherein said coil supporting means is an insulating support tube extending axially through said pancake windings.

3. A shunt reactor in accordance with claim 1 wherein said coil supporting means is of homogeneous insulating material having a dielectric constant approximately equal to that of phenolic material.

4. A shunt reactor in accordance with claim 2 wherein the axial spacing between adjacent pancake windings is approximately equal to the spacing between said core end portions and the pancake windings at the axial ends of said coil and wherein said coil supporting means includes a plurality of inside insulating cylinders disposed within said axial opening in said coil concentric about said horizontal axis and surrounded by said pancake windings and said insulating washers.

5. A shunt reactor in accordance with claim 4 wherein said pancake windings are constructed of conductor of rectangular cross section and the voltage gradient within said coil is high adjacent the edges of the radially inner and radially outer conductor turns of said pancake windings, and means including annular insulating collars disposed over said edges of said radially inner and radially outer turns for insulating between said pancake winding.

6. A shunt reactor in accordance with claim 5 wherein said inside insulating cylinders and said insulating washers and said insulating collars are impregnated with said dielectric liquid and including arcuately spaced, radially extending insulating spacers affixed to said insulating washers and providing cooling ducts for circulation of said dielectric liquid between adjacent pancake windings and arcuately spaced insulating spacers extending parallel to the axis of said coil disposed between said concentric inside insulating cylinders and providing cooling ducts for circulation of said dielectric liquid in a direction parallel to the axis of said coil.

7. A shunt reactor in accordance with claim 6 wherein said pancake windings in each said coil half are arranged in pairs of adjacent pancake windings connected together at their radially inner end and said insulating washers are disposed between the windings of each said winding pair and also between adjacent winding pairs and certain of said insulating collars have radially extending portions extending between adjacent winding pairs at the radially inner end thereof and overlapping said insulating washers and other of said insulating collars have portions extending radially between the windings of each of said pairs adjacent the radially outer end thereof and overlapping said insulating washers.

8. A shunt reactor in accordance with claim 1 wherein said coil supporting means includes a plurality of concentric inside insulating cylinders disposed within said axial opening in said coil and concentric about said horizontal axis and surrounded by said pancake windings and said insulating washers and wherein said pancake windings are constructed of conductor of rectangular cross section and the voltage gradient is high adjacent the edges of radially inner and radially outer conductor turns of said pancake windings and including inner and outer insulating collars disposed over said edges of said radially inner and outer conductor turns and overlapping said insulating washers.

9. A shunt reactor in accordance with claim 8 wherein said inside insulating cylinders and said insulating washers and said insulating collars are impregnated with said dielectric liquid and including arcuately spaced, radially extending spacer members affixed to said insulating washers and providing cooling ducts for circulation of said dielectric fluid between said pancake windings and arcuately spaced insulating spacers extending parallel to the axis of said coil disposed between said concentric inside insulating cylinders and providing cooling ducts for circulation of said liquid dielectric in a directon parallel to the axis of said coil.

10. A shunt reactor in accordance with claim 9 wherein said pancake windings in each coil half are arranged in pairs of adjacent pancake windings connected together at their radially inner end and said insulating washers are positioned between the windings of each said winding pair and also between adjacent winding pairs and said inner insulating collars have portions extending radially between adjacent winding pairs and said outer insulating collars have portions extending radially between the windings of each said winding pair.

11. A shunt reactor in accordance with claim 10 and including a plurality of horizontally spaced insulating sheets impregnated with said dielectric liquid disposed in vertical planes parallel to said coil axis between said pancake windings and said magnetic core side portions and wherein certain of said insulating washers extend radially beyond said pancake windings and overlap said insulating sheets.

12. A shunt reactor in accordance with claim 3 wherein said coil supporting means includes a plurality of inside insulating cylinders disposed within said axial opening in said coil concentric about said horizontal axis and surrounded by said insulating washers and said pancake windings, and also including inner and outer insulating collars disposed over the edges of the radially inner and radially outer conductor turns of said pancake windings where the voltage gradient is high within said coil.

13. A shunt reactor in accordance with claim 12 wherein the axial spacing between adjacent pancake windings is approximately equal to the spacing between said core end portions and the pancake windings at the axial ends of said coil and said conductor is of rectangular cross section and said insulating washers, insulating inside cylinders, and insulating collars are impregnated with said dielectric liquid and including arcuately spaced insulating spacers affixed to said insulating washers and providing cooling ducts for circulation of said dielectric liquid between said pancake windings and also including arcuately spaced insulating members extending parallel to the axis of said coil disposed between said concentric inside insulating cylinders and providing cooling ducts for circulation of said liquid dielectric in a direction parallel to the axis of said coil.

14. A shunt reactor in accordance with claim 13 wherein said pancake windings in each coil half are arranged in pairs of adjacent pancake windings electrically connected together at their radially inner end and said insulating washers are disposed between the windings of each winding pair and also between adjacent winding pairs and said inner insulating collars have portions extending radially between adjacent winding pairs and overlapping said insulating washers and said outer insulating collars have portions extending radially between the windings of each said pair and overlapping said insulating washers.

15. A shunt reactor in accordance with claim 14 wherein said horizontal member is a support tube of high mechanical strength insulating material capable of withstanding, without failure, a potential gradient greater than 50 kilovolts per inch when said coil is subjected to a low frequency overvoltage test.

16. A shunt reactor in accordance with claim 15 and including a plurality of horizontally spaced insulating sheets impregnated with said dielectric liquid disposed in vertical planes parallel to said coil axis between said pancake windings and each of said magnetic core side portions and wherein said insulating sheets progressively decrease in length in a direction away from said core side portions and certain of said insulating washers extend radially beyond said pancake windings and overlap said insulating sheets and wherein said material of said support tube has a dielectric constant approximately equal to that of phenolic material and that of said dielectric liquid impregnated insulating washers and insulating collars and insulating inside cylinders and insulating sheets.

17. A shunt reactor in accordance with claim 6 wherein said inside insulating cylinders and insulating washers and insulating collars are of cellulosic material and said support tube is of a homogeneous insulating material having a dielectric constant approximately equal to that of phenolic material and that of cellulosic material impregnated with said liquid dielectric.

18. A shunt reactor in accordance with claim 6 and including a plurality of horizontally spaced sheets of cellulosic insulating material impregnated with said dielectric liquid disposed in vertical planes parallel to said coil axis between said pancake windings and each of said magnetic core side portions.

19. A shunt reactor having high inductance per unit volume comprising, in combination, a casing, a cylindrical coil having a horizontal axis and an axial opening and nonmagnetic means disposed in said axial opening and including a plurality of inside insulating cylinders concentric about said axis and a plurality of axially spaced pancake windings surrounding said inside insulating cylinders and being coaxial therewith and disposed in a stack and being constructed of rectangular strip conductor having a width in the axial direction considerably greater than the thickness in the radial direction and also inclding radially extending insulating washers disposed between adjacent pancake windings and surrounding said inside insulating cylinders, a cooling and insulating dielectric liquid within said casing, said coil being immersed in said liquid dielectric and permitting circulation of said dielectric liquid vertically between said axially spaced pancake windings, a closed magnetic core comprising laminations in planes parallel to the axis of said coil immersed in said dielectric liquid within said casing and having core end portions disposed adjacent the axial ends of said coil and core side portions parallel to the coil axis connecting said core end portions, the axial spacing between adjacent pancake windings being approximately uniform and approximately equal to the spacing between said core end portions and the pancake windings at the axial ends of said coil, said pancake windings of said coil being arranged in two similar coil halves each of which comprises the pancake windings between the center and one end of said stack, the pancake windings in each coil half being connected in series and the windings in said two coil halves being wound in opposite directions, the pancake windings at the axial ends of said coil being adjacent said core end portions and adapted to be connected to ground, a pair of adjacent pancake windings at the center of the coil stack, one of which is in each of said coil halves, being adapted to be connected to a high voltage conductor, the voltage gradient being high adjacent the edges of the radially inner and radially outer conductor turns of said pancake windings, and including inner and outer insulating collars disposed over said edges of said radially inner and outer conductor turns and having radially extending portions overlapping said insulating washers.

20. A shunt reactor in accordance with claim 19 wherein said inside insulating cylinders, said insulating washers and said insulating collars are impregnated with said dielectric liquid and including arcuately spaced radially extending insulating spacers affixed to said insulating washers and providing cooling ducts for circulating of said dielectric liquid between adjacent pancake windings and arcuately spaced insulating spacers extending parallel to the axis of said coil disposed between said concentric inside insulating cylinders and providing cooling ducts for circulation of said dielectric liquid in a direction parallel to the axis of said coil.

21. A shunt reactor in accordance with claim 20 wherein said pancake windings in each said coil half are arranged in pairs of adjacent pancake windings connected together at their radially inner end and said insulating washers are disposed between the windings of each said winding pair and also between adjacent winding pairs and said radially inner insulating collars have portions extending radially between adjacent winding pairs at the radially inner end thereof and overlapping said insulating washers and said radially outer insulating collars have portions extending radially between the windings of each of said pairs adjacent the outer end thereof and overlapping said insulating washers.

References Cited

UNITED STATES PATENTS

| | | | |
|---|---|---|---|
| 1,603,058 | 10/1926 | Biermanns | 336—70 |
| 1,713,214 | 5/1929 | Brand | 336—221 XR |
| 2,723,933 | 11/1955 | Isenberg | 336—185 XR |
| 2,853,657 | 9/1958 | Hafacker | 336—185 XR |
| 2,993,183 | 7/1961 | Moore et al. | 336—70 XR |
| 3,014,189 | 12/1961 | MacKinnon et al. | 336—232 XR |
| 3,151,304 | 9/1964 | Miller | 336—60 XR |
| 3,160,839 | 12/1964 | Bennon et al. | 336—5 XR |
| 3,195,082 | 9/1965 | Wetherill et al. | 333—210 XR |
| 3,195,087 | 9/1965 | Welch | 336—210 XR |

LARAMIE E. ASKIN, *Primary Examiner.*

T. J. KOZMA, *Assistant Examiner.*